United States Patent [19]
Chiabrera et al.

[11] Patent Number: 5,729,660
[45] Date of Patent: Mar. 17, 1998

[54] 3-D INVERSE SCATTERING BY ARTIFICIAL INTELLIGENCE : APPARATUS AND METHOD

[76] Inventors: Alessandro Chiabrera, Viale Cambiaso 1/15, 16145 Genoa; Bruno Bianco, Via Cabella 22/3, 16122 Genoa, both of Italy; Jonathan J. Kaufman, 112 Willow St., Bklyn, N.Y. 11201

[21] Appl. No.: 733,003

[22] Filed: Oct. 16, 1996

Related U.S. Application Data

[63] Continuation-in-part of Ser. No. 237,617, May 3, 1994.
[51] Int. Cl.$^6$ .................. G06E 1/00; G06E 3/00
[52] U.S. Cl. .................. 395/22; 395/20; 395/21
[58] Field of Search .................. 395/20–25, 27; 382/155–159

[56] References Cited

U.S. PATENT DOCUMENTS

| | | | |
|---|---|---|---|
| 4,739,496 | 4/1988 | Marom et al. | 365/125 |
| 4,750,153 | 6/1988 | Owechko et al. | 365/125 |
| 4,958,939 | 9/1990 | Samad | 382/223 |
| 5,003,490 | 3/1991 | Castelaz et al. | 364/513 |
| 5,031,154 | 7/1991 | Watanabe | 367/8 |
| 5,132,813 | 7/1992 | Caulfield et al. | 359/11 |
| 5,132,835 | 7/1992 | Stoll et al. | 359/339 |
| 5,136,687 | 8/1992 | Edelman et al. | 395/22 |
| 5,276,771 | 1/1994 | Manukian et al. | 395/24 |
| 5,455,892 | 10/1995 | Minot et al. | 395/23 |

FOREIGN PATENT DOCUMENTS 1283915  5/1968  United Kingdom .

OTHER PUBLICATIONS

"Restructive Tomography and Applications to Ultrasonics," Rolf K. Mueller et al., *Proceeding of the IEEE*, vol. 67, No. 4, Apr. 1979, pp. 567–587.

"Ultrasonic Robot Eyes Using Neural Network," Sumio Watanabe et al., *IEEE Transactions on Ultrasonics Ferroelectrics and Frequency Control*, vol. 37, No. 2, May 1990, pp. 141–147.

"An Ultrasonic Robot Eye System for Three–Dimensional Object Recognition Using Neural Network," Sumio Watanabe et al., *1990 Ultrasonics Symposium*, pp. 351–354.

(List continued on next page.)

*Primary Examiner*—Tariq R. Hafiz
*Attorney, Agent, or Firm*—Dykema Gossett PLLC

[57] ABSTRACT

An unknown object is non-destructively and quantitatively evaluated for three-dimensional spatial distribution of a set of material constitutive parameters of the unknown object, using a multi-element array-source transducer and a multi-element array-detector transducer located near the unknown object. The array-source transducer exposes the array-detector transducer to a set of source-field patterns pursuant to a set of electrical input signals. An unknown object located near these transducers will be the cause of scattering, thus presenting a scattered-field pattern to the array detector transducer, for each pattern of the set of source-field patterns. In a related computation, a set of training signals is determined by evaluating on a computer the scattered field from a set of computer simulated training objects. A computer, a signal processor and a neural network operate from detector response to the computer simulated and unknown object scattered-field patterns, in each of two modes. In an initial mode, the neural network is "trained" or configured to process a set of transfer functions involved in array-detector response to scattered-field patterns evaluated by computer simulations for the known computer simulated objects; in another mode, the neural network utilizes its "trained" configuration in application to a set of transfer functions involved in array-detector response to scattered-field patterns produced by an unknown object, to generate estimates of the three-dimensional spatial distribution of the material constitutive parameters of the unknown object. In another embodiment, a set of the Biot poro-elastic material parameters of an unknown object is estimated.

16 Claims, 5 Drawing Sheets

OTHER PUBLICATIONS

"Neural Network Recognizing 3–Dimensional Object Through Ultrasonic Scattering Waves," M. Yoneyama et al., *1988 Ultrasonics Symposium*, pp. 595–598.

"Theory of Propagation of Elastic Waves in a Fluid–Saturated Porous Solid," M.A. Biot, *The Journal of the Acoustical Society of America*, vol. 28, No. 2. Mar. 1956, pp. 168–191.

"Real–Time Parallel Computation and Visualization of Ultrasonic Pulses in Solids," R.S. Schechter et al., *Science*, Aug. 26, 1994, 1994, vol. 265, pp. 1188–1192.

"An Ultrasonic 3–D Object Recognition Method Based on the Unified Neural Network Theory", Sumio Watanabe et al., *1992 Ultrasonic Symposium*, pp. 1191–1194.

"An Ultrasonic Visual Sensor using a Neural Network and its Application for Automatic Object Recognition," Sumio Watanabe et al., *1991 Ultrasonics Symposium*, pp. 781–784.

"An Ultrasonic Visual Sensor for Three–Dimensional Object Recognition Using Neural Networks," Sumio Watanabe et al., *IEEE Transactions on Robotics and Automation*, vol. 8, No. 2, Apr. 1992, pp. 240–249.

"Recent Developments in the Acoustic Properties of Porous Media," D.L. Johnson, *Frontiers in Physical Acoustics*, 1986, pp. 255–290.

Watanabe et al, "An ultrasonic visual sensor for three–dimensional object recognition using neural networks"; IEEE Transactions on robotics and automation, pp. 240–249, vol. 8, No. 2, Apr. 1992.

Watanabe et al, "An ultrasonic robot eye system for three–dimensional object recognition using neural networks" IEEE 1990 Ultrasonic symposium proceedings, pp. 351–354 vol. 1, 4–7 Dec. 1990.

Yoneyama et al, "Neural network recognizing 3–dimensional object through ultrasonic scattering waves"; IEEE 1988 ultrasonic symposium. Proceedings, pp. 595–598 vol. 1, 2–5 Oct. 1988.

Watanabe et al, "An ultrasonic visual sensor using a neural network and its application for automatic object recognition"; IEEE 1991 Ultrasonics symposium proceedings, pp. 781–784 vol. 2, 8–11 Dec, 1991.

Watanabe et al, "An ultrasonic 3D object recogntion method based on the unified neural network theory"; IEEE 1992 Ultrasonics symposium, pp. 1191–1194 vol. 3, 20–23 Oct. 1992.

3-D INVERSE SCATTERING BY ARTIFICIAL INTELLIGENCE : APPARATUS AND METHOD

RELATED CASE

This application is a continuation-in-part of application Ser. No. 08/237,617, filed May 3, 1994.

BACKGROUND OF THE INVENTION

The invention pertains to apparatus and method for non-destructively and quantitatively determining the three-dimensional spatial distribution of the material constitutive parameters of an unknown object.

In recent years, various attempts have been made to non-destructively image unknown objects by interrogating them with one form of energy or another. Because of the inherent mathematical as well as practical complexities in the three-dimensional imaging problem, the degree of success thus far has been limited.

Most developments in 3-D imaging have been in computerized X-ray tomography. Hounsfield, British Patent Specification 1 283 915 disclosed method and apparatus for examining a body by X-ray or gamma radiation. A related publication by Bracewell et al. entitled "Inversion of fan-beam scans in radio astronomy," in the *Astrophysical Journal*, Vol 150, pp. 427–434 (1967) describes another variation of the tomographic method. These and related tomographic techniques all use analytic mathematical inversions of the measurements to obtain the 3-D reconstructed object data.

Similar attempts have been made for developing ultrasonic tomographic techniques, with much less success. This is due in part to the inherently greater complexity of acoustic wave propagation, in which diffraction, beam spreading and mode conversion effects are more significant. This produces a much more difficult problem in terms of inverting the measurements and obtaining the constitutive properties of the unknown object. Some of these issues are discussed in the review by Mueller et al., entitled "Reconstructive tomography and applications to ultrasonics," in the *Proceedings of the IEEE*, Vol. 67, pp. 567–587 (1979).

In general, the inverse scattering problem, of which computerized tomography is a particular example, is often mathematically intractable and makes practical implementation difficult to achieve. This is true whether the interrogating field is electromagnetic or acoustic.

Some recent attempts at incorporating artificial intelligence methods, typically neural networks, into three-dimensional imagining applications have been reported. U.S. Pat. No. 5,031,154 to Watanabe discloses a method and system which uses ultrasonic waves and a neural network to obtain the three-dimensional shape of an object. Two fields of mutually different frequencies are used to irradiate the object and measure the sound pressures of the scattered waves from the object to obtain two acoustical holographic images thereof. A neural network signal processor operates on the phase error between the two holographic images to estimate the object shape in three dimensions. An earlier publication by Watanabe et al., "The Ultrasonic Robot Eye System Using Neural Network," in Electronic Information Communication Society, 2.22, 1989, addressed a simpler version of the problem in which less definition of the object was obtained.

Several patents deal with holographic techniques for constructing associative electronic memories. U.S. Pat. No. 4,739,496 to Marom et al. discloses an apparatus for holographic memory storage employing phase conjugate mirrors. Owechko et al., U.S. Pat. No. 4,750,153 discloses a holographic memory apparatus also employing phase conjugate mirrors and a two-wave mixing contra-directional coherent image amplifier.

Some patents have dealt with the use of holographic techniques for implementing neural networks. U.S. Pat. No. 5,132,835 to Stoll et al. discloses apparatus and method for implementing in continuous time a neural network employing optical techniques. Caulfield et al., U.S. Pat. No. 5,132,813 discloses apparatus for neural network processing using holographic optical paths and nonlinear optics.

A general signal processing technique is described by Castelaz et al. in U.S. Pat. No. 5,003,490. They disclose a neural network signal processor which transforms unprocessed sensor signals into a desired output. The approach used by Castelaz et al. in quite broad and does not take into account any features of a specific application. The training of the neural network is similar to that described in Rumelhart, Hinton, and Williams, "Learning Internal Representations by Error Propagation," in D. E. Rumelhart and J. L. McClelland (Eds.), Parallel Distributed Processing; Explorations in the Microstructure of Cognition. Vol. 1: Foundations, MIT Press (1986).

The prior art, exemplified by the references that have been briefly discussed, has focussed primarily either on direct analytic solution of the inverse scattering problem, or on simplified imaging applications. At the same time, little attention has been given to the tremendous capabilities of artificial intelligence methods with respect to their application to the general 3-D reconstruction problem, namely, for inverse scattering. Most prior applications of neural networks in 3-D imagining have been for qualitative object reconstructions (i.e., shape), but apparently have not yet found extensive application in the inverse scattering area. Holographic methods have been described for implementing neural networks, as well as for electronic memory storage.

The available state of the art of inverse scattering is typically achieved by means of complex and often unwieldy numerical algorithms; even so, such results are available in an extremely limited number of cases. In addition, the practical success of the reconstruction, based on current approaches, depends on several factors, including:

(1) complete knowledge of underlying field equations;

(2) full characterization of the fields generated by the sources (e.g., monochromatic planar wave or equivalent simple source field pattern);

(3) large volume of the embedding medium with respect both to the cubic power of the field wavelength in the medium itself, and to the object volume (the infinite embedding medium);

(4) large extension of the detector array surface in the embedding medium (the infinite detector array);

(5) ideal point detectors, which measure the amplitude, or both amplitude and phase, of the detected field components (infinite resolution);

(6) full absorption of the field incident on the detector array surface, without any reflection;

(7) low noise; and (8) reliability, efficiency and speed of the algorithms used for inversion of the field equations and three-dimensional reconstructions.

When item (1) above is well-established (e.g., viscoelastic equations for acoustic fields, and Maxwell equations for electromagnetic fields), all the other points are fulfilled only to a limited extent, leading to practical pitfalls and difficulties in achieving three-dimensional reconstruction of an object.

BRIEF STATEMENT OF THE INVENTION

It is accordingly an object of the invention to provide an improved method and apparatus for non-destructively and quantitatively determining the three-dimensional (3-D) spatial distribution of material constitutive parameters of an unknown object.

Another object is to meet the above object, such that the constitutive parameters of a given object may be readily and more reliably evaluated than heretofore.

A specific object is to achieve the above objects with small time delay if desired, using artificial intelligence means, to enable for a given object an approximate on-line evaluation of 3-D spatial distribution of constitutive parameters.

It is a general object to achieve the foregoing objects with apparatus components that are for the most part commercially available.

Briefly stated, the invention in its presently preferred form achieves the foregoing objectives by subjecting the unknown object to a sequence of narrowband source-field patterns, $F_j$, $j=1, \ldots, N'$. The set of source-field patterns, $F_\pi = \{F_j, j=1, \ldots, N'\}$, is obtained by exciting an N-element array-source transducer with a collection of N' electrical input signals, each such signal comprising a vector of N sinusoidal waveforms of prescribed amplitudes and phases, and each of frequency $f_o$, where $f_o$ is in the range from 0 Hz to 100 GHz. This vector waveform is applied to the respective N-elements of the array-source transducer. In general, N', N >> 1, and N' may or may not equal N. Each source-field pattern is applied for a period of time exceeding $10/f_o$, making sure that all signal transients have decayed sufficiently; thus the entire set, $F_\pi$, of source-field patterns is applied for a period of time exceeding $10N'/f_o$. (In the case $f_o=0$, any suitable T can be chosen which allows for sufficient signal-to-noise ratio in the processed data.) The unknown object is thereby exposed to a set of source-field patterns, whereby producing a scattered field associated with the exposed unknown object and source-field pattern. Each scattered field associated with each source-field pattern is detected by an array-detector transducer consisting of M receiving elements, where M is much larger than 1. Signal-processing of each received signal output from the detector transducer associated with the scattered field is operative to produce a scalar transfer function value estimate, $H_{ij}(f_o)$, where $H_{ij}(f_o) \Delta Y_{ij}(f_o)$, and $Y_{ij}(f_o)$ is the Fourier transform, evaluated at the frequency $f_o$, of the signal received by the $i^{th}$ detector array element, $y_{ij}(t)$, when the source-field pattern equals $F_j$. This procedure is repeated for each source-field pattern and for each received signal output from the detector transducer, to produce a set, K, of scalar complex transfer function estimates associated with the unknown object, where $K=\{H_{ij}(f_o), i=1, \ldots, M, j=1, \ldots, N'\}$. In a separate set of operations not involving the unknown object, the same transducers response to the transmission and reception of the identical set, $F_\pi$, of N' source-field patterns and N' scattered fields, respectively, for each object within a collection of K training objects whose three-dimensional spatial distributions of a set of their constitutive parameters is known a priori. Signal processing is operative to estimate the complete set of transfer-functions values, $K_g=\{H^k_{ij}(f_o), i=1, \ldots, M, j=1, \ldots, N', k=1, \ldots, K\}$ associated with the set of K training objects, where $H^k_{ij}(f_o)$ is the complex Fourier transform evaluated at the frequency, $f_o$, of the signal received by the $i^{th}$ detector array element, $y_{ij}(t)$, when the source-field pattern equals $F_j$, and the $k^{th}$ object of the training set is being interrogated. This set, $K_g$, of K-training signals or patterns, serves as input to a neural network, and is comparatively processed together with the known constitutive parameters of the K training objects, using error backpropagation, to train the neural network to output with minimum error an estimate of a set of material constitutive parameters of the training objects. Once trained, the appropriately configured neural network is used to process the set of transfer function values, K, associated with the unknown object, whereby to generate the indicated estimates of a set of material constitutive parameters of the unknown object that is currently being analyzed.

BRIEF DESCRIPTION OF THE DRAWINGS

The invention will be described in detail for a presently preferred embodiment, in conjunction with the accompanying drawings, in which.

DETAILED DESCRIPTION OF THE INVENTION

The invention will be described in detail for a presently preferred embodiment, in conjunction with the accompanying drawings.

Figure 1:
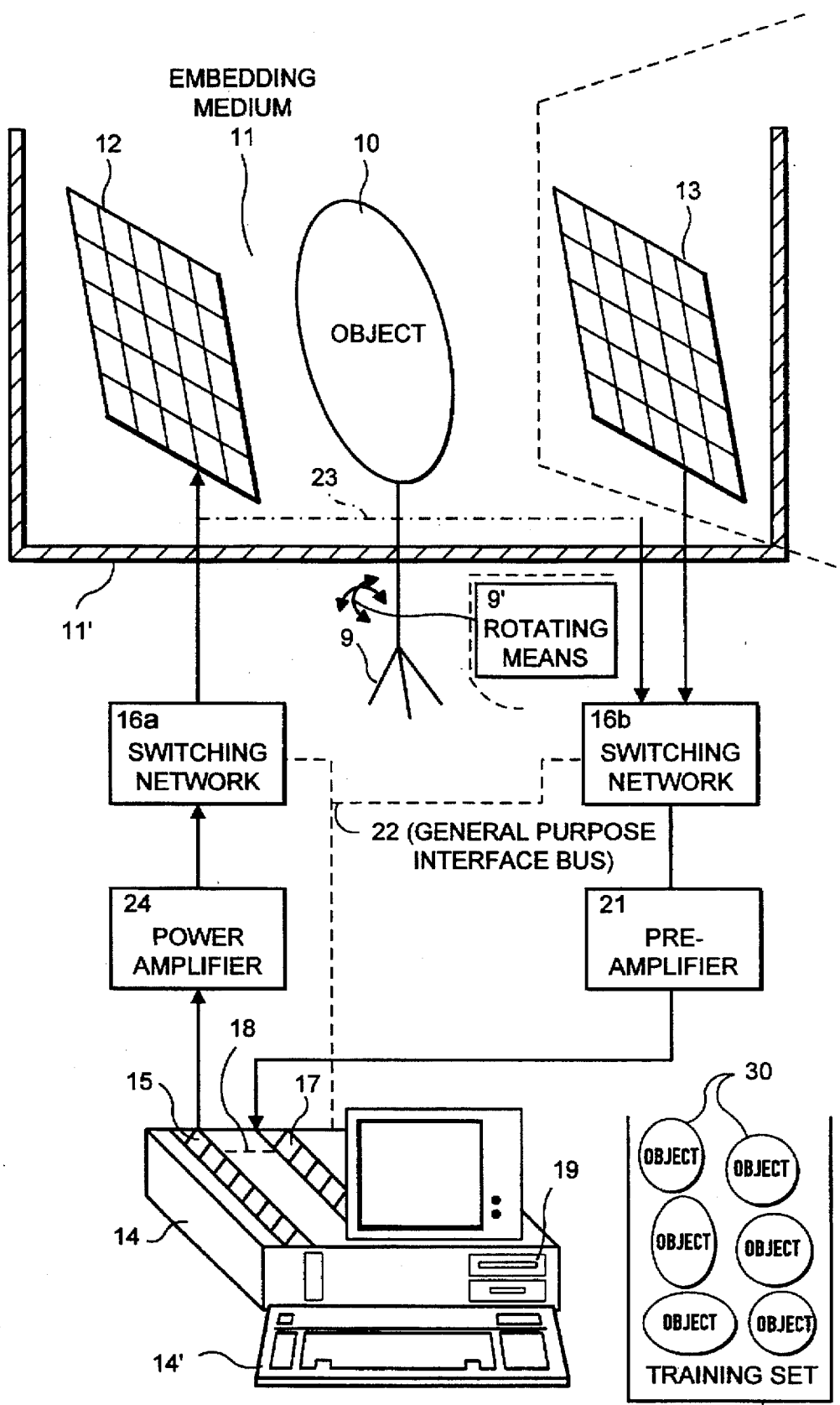
FIG. 1 is an electrical-circuit diagram schematically showing the interconnected relation of components of apparatus of the invention.

The invention is shown in FIG. 1 in application to interconnected components for construction apparatus for performing methods of the invention, namely for non-destructively and quantitatively determining the three-dimensional spatial distribution of a set of material constitutive parameters of an unknown object. These components are, in general, commercially available from different sources and will be identified before providing detailed description of their total operation. In FIG. 1, an unknown object 10 to be analyzed non-destructively suitably supported is shown surrounded by an embedding medium 11, which may for example, be either air or water, and to be interposed between two array transducers, namely, an array-source transducer, 12, and an array-detector transducer, 13. These transducers may be identically the same, and are commercially available from Acoustic Imagining, Inc., Phoenix, Ariz.; suitably, each of the transducers 12, 13 may have a nominal element size of 1×1 mm square, each rated for 5 MHz, and each consisting of 20 elements (N=M=20). As shown, transducer 12 is used for signal launching, and transducer 13 is the receive of the launched signals after scattering by the object 10 and its embedding medium 11. The support 9, for the unknown object may be a simple rigid support, or may be suitably a 2-axis manual rotation positioning system, commercially available from the Daedal Division of Parker Hannifin Corporation, Harrison City, Pa., and shown as item 9', as indicated by the dotted line in FIG. 1.

Basic operation is governed by computer means 14, which may be a PC computer, such as the "66 MHz Pentium" available from Gateway 2000, Inc., North Sioux City, South Dakota; as its designation suggests, this computer contains a 66 MHz clock-pulse generator, and an Intel 586 (Pentium) processor, with provision for keyboard instruction at 14'.

A sinusoidal function-generator card 15 is relied upon to generate an excitation signal which is supplied to the launch transducer 12, via power amplifier means 24 and a switching network 16a. The power amplifier is suitably Model No. 240L, and RF power amplifier product of EIN, Inc., Rochester, New York. This product provides a 50 dB gain, over the range 20 kHz to 10 MHz.

The excitation signal generated by card 15 is a continuous sine-wave signal, consisting of a single frequency, $f_o$; in the present embodiment, $f_o$ can be any selected frequency in the range from 20 kHz to 20 MHz. Card 15 may suitably by a waveform synthesizer product of Quatech, Inc., Akron, Ohio, identified by Quatech part No. WSB-100. This waveform synthesizer generates analog signals independent of the host computer 14, allowing full processor power to be used for other tasks, including calculation of waveform data; it has the capacity to generate an output signal comprising literally thousands of points in the indicated frequency range.

The switching network 16a is a signal routing and measurement switch which sequentially connects the single channel output of the waveform generator card 15 via power amplifier 24 to each of the N channels of the array-source transducer 12. Network 16a may suitably be a test system switch product of Hewlett-Packard Co., Santa Clara, Calif., identified by Hewlett-Packard part No. HP 3235A. This switch unit provides capability for switching literally thousands (for this model a total of 20,480) of two-wire analog points, under computer control via a general-purpose interface bus (GPIB) 22, shown as a dashed line in FIG. 1.

Receiving transducer 13 is connected to a switching network 16b, which may be identical to switching network 16a. Also shown in dotted lines is an electrical conductor 23, between the array-source transducer and switching network 16b, used in an alternative embodiment of the invention, in which transducer 12 also serves as a receiver. Network 16b is also under computer control via bus GPIB 22, and is connected to a preamplifier 21 for signal conditioning. Preamplifier 21 may suitably be a battery powered amplifier with a bandwidth 50 khz-10 MHz and gain of 40 dB, part number 5670, available from Panametrics, Inc., Waltham, Mass.. An A/D card 17 is also shown installed in the computer for converting into digital format signals received at 13, switched via switching network 16b and amplified at 21 into digital format for further processing in computer 14. Card 17 may suitably be a 100 MHz waveform digitizer, part number "STR*8100", a product available from SONIX, of Springfield, Va.. A conductor 18 is shown by dashed lines, connecting the signal-generator card 15 to the A/D card 17, for synchronizing purposes and for the purposes of digitizing the excitation signals, to enable computer 14 to perform a suitably compensated, continuously operative updating average of the magnitudes and phases of the signals received at 13.

Finally, general signal-processing/display/storage software, for signal processing, control and operation of the computer is not shown but will be understood to be a floppy disk loaded at 19 into the computer; this software is suitably the MATLAB-386, available from The MathWorks, Inc., Natick, Mass.. Further software, also not shown, will be understood to include signal-processing and neural-network toolboxes, also available from MathWorks, as well as Fortran 5.0, available from Microsoft Corporation, Bothell, Wash., and LabView, available from National Instruments Corporation, Austin, Tex..

In the presently preferred embodiment, involving the described components of FIG. 1, the same components are utilized not only for performing a continuously updated averaging of the latest succession of signal magnitudes and phases received at 13, after scattering by unknown object 10, but also for establishing and entering into computer storage the signals scattered by a set 31, of known training objects which are known as training signals. The training objects 30, may be constructed in any number of ways, which will depend upon the class of unknown objects 10 which are being investigated. The training signals are collected by removing the unknown object 10 and replacing it by each training object 30 from the training set 31. In the presently preferred embodiment, the training and unknown objects are spherical shells of polymethylmethacrylate (PMMA) with outer radius $r_o$=5 cm, and inner radius $r_i$, where $0<r_i<5$ cm. The inner portion of the spherical object, that is, for radius $r<r_i$, is filled with air. The training set may illustratively contain 20 objects, with inner radii from 1 cm to 4.8 cm, in 2 mm increments. The training and unknown objects reside in an embedding medium consisting of deionized water, to which the acoustic transducers are coupled, which is contained in a plastic tank, 11'.

Computer operation on received signals associated with the unknown object will be assumed to be signal-processed in the computer into Fourier transforms of the received signals, to obtain the set of Fourier transforms associated with the unknown object. Similarly, received signals associated with the training objects will be referred to as training signals, and will also be signal-processed in the computer into their respective Fourier transforms associated with the training objects.

The computer will be understood to be further programmed to evaluate the magnitudes and phases of Fourier transforms of the respective received signals and training signals, for each output array element and for each input field distribution, sometimes also referred to as source-field patterns. The former are termed the signal magnitudes and phases, and the latter are termed the training magnitudes and phases. The training magnitudes and phases serve to construct the set $K_g=\{H^k_{ij}(f_o), i=1, \ldots, M, j=1, \ldots, N', k=1, \ldots, K\}$ of transfer functions associated with K training objects, where $H^k_{ij}(f_o)$ is the complex Fourier transform evaluated at the frequency, $f_o$, of the signal received by the $i^{th}$ detector array element, $y_{ij}(t)$, when the input field distribution equals $F_j$, and the $k^{th}$ object of the training set is being interrogated. This set, $K_g$, together with the respectively known values of constitutive properties of the training objects, are supplied to the neural network for training using the backpropagation algorithm. Finally, the magnitudes and phases of the signals associated with the unknown object, i.e., the signal magnitudes and phases, are supplied within to the neural network, it being understood that the neural network has already been trained and configured, to generate an estimate of the above indicated and currently estimated unknown object's material constitutive parameters.

Figure 2:
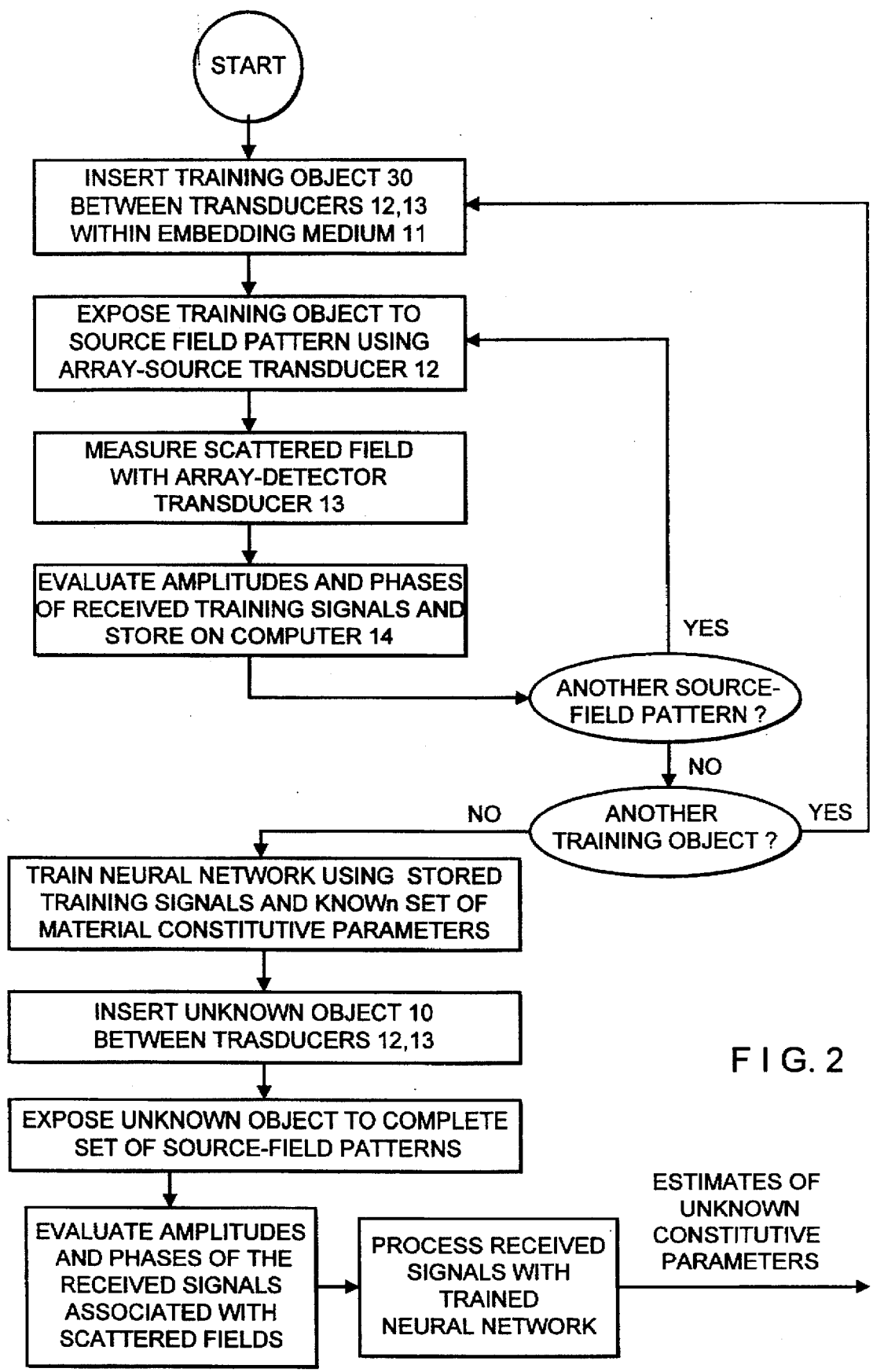
FIG. 2 is a flow chart of computer-controlled operations in automatically analyzing and quantitatively reporting estimates of relevant constitutive parameters.

In the presently preferred embodiment of the invention and with additional reference to the flow diagram of FIG. 2, data is collected and processed as follows. An unknown object (10) is placed within an embedding medium consisting of deionized water (11) and between two ultrasonic array transducers (12, 13). A time-harmaonic (i.e., sinusoidal) ultrasonic signal is transmitted from each array element of transducer (12), passes through the embedding medium and scattered by the unknown object, and is received by each array element of the other transducer. The transmitted ultrasound signal is generated using a continuous time sinusoidal input waveform, i.e., $v(t)=\sin(2\pi f_o t)$, $0 \leq t \leq T$, and T is chosen to be at least 10 times longer than the period ($T \geq 10/f_o$). In this preferred embodiment, the frequency $f_o$=5 MHz.

The above waveform is transmitted continuously for a period of time allowing accurate estimates of the magnitude and phase of the received signals to be made. In the presently preferred embodiment, each received waveform, $y_{ij}(t)$, associated with the $i^{th}$ array element of the receiving transducer and the $j^{th}$ input field pattern, respectively, is recorded for a total time $T=100/f_o=20$ μs. In this embodiment, the $j^{th}$ source-field pattern is produced when the jth element of the array-source transducer is excited by the sinusoidal input signal and all other source transducer array element voltages are set to zero. Subsequently, the Discrete Fourier Transform (DFT), $y_{ij}(f_o)$, of $y_{ij}(t)$, is obtained using the Fast Fourier Transform (FFT) algorithm, and stored on the computer.

The above procedure is repeated for $i=1, \ldots, M$, that is, for each element of the array-detector transducer, and for each source-field pattern, $j=1, \ldots, N'$. In the presently preferred embodiment, the number of source-field patterns, N', is equal to the number of array-source elements, i.e., $N=N'=20$. Further, the $j^{th}$ source-field pattern, $j=1, \ldots, 20$, corresponds to the $j^{th}$ array-source element being excited by the sinusoidal input signal, v(t), with all other inputs set to zero. More precisely, if $v_j(t)$ is the N-dimensional electrical input signal vector associated with the $j^{th}$ input field distribution, where each element of $v_j(t)$ is associated respectively with each element of the array-source transducer, then $v_j(t)=[v_1(t) \ldots v_j(t) \ldots v_n(t)]$, where $v_j(t)=v(t)$, and $v_m(t)=0$, $m=1, \ldots, N$, $m \neq j$, and N=20. Thus, the set, $F_{\pi}$, of N' input field distributions is obtained by applying the set, $v_{\pi}$, of N' input excitation voltages sequentially, where $v_{\pi}=\{v_1(t) \ldots v_j(t) \ldots v_{N'}(t)\}$.

The data is then collected for storage in the computer as a set of N'M=NM=400 complex numbers associated with the excitation frequency, $f_o$, and the unknown object being interrogated. This set is given the notation $K=\{H_{ij}(f_o), i=1, \ldots, M, j=1, \ldots, N'\}$, where $H_{ij}(f_o)$ is termed the transfer-function value associated with the $j^{th}$ source-field pattern and $i^{th}$ element of the array-detector transducer; note that $H_{ij}(f_o) \Delta Y_{ij}(f_o)$, where $Y_{ij}(f_o)$ is defined above.

The above set K provides the inputs to an appropriately configured neural network to generate an estimate of a set of the material constitutive parameters of an unknown object. In the presently preferred embodiment, the neural network is a feedforward network with 800 inputs (a magnitude and phase for each of the 400 complex values of $H_{ij}(f_o)$ (for i,j=1, $\ldots, 20$), 200 hidden units and 250 outputs. The 250 outputs are chosen based on a compromise between (i) the degree of resolution desired in the reconstruction of the set of material constitutive parameters of the unknown object; (ii) the information content of the sensor data with respect to the acoustic field equations; and (iii) the desire for minimizing the complexity of the neural network (and thereby the complexity of the training procedure). The first constraint seeks to maximize the number of outputs of the neural network, the last constraint attempts to minimize the number of outputs, while the second constraint provides a theoretical upper limit on the number of outputs required for a fixed number of inputs, as described below. In the presently preferred embodiment, the neural network is appropriately configured prior to presentation of the data set, K, associated with the unknown object, by training it with the backpropagation algorithm. The training data consists of K training patterns and the inputs associated with the training patterns are the set of KMN' transfer-function complex values associated with the K training objects, namely $K_g=\{H^k_{ij}(f_o), i=1, \ldots, M, j=1, \ldots, N', k=1, \ldots, K\}$. $H^k_{ij}(f_o)$ is the complex Fourier transform evaluated at the frequency, $f_o$, of the signal received by the $i^{th}$ detector array element, $y_{ij}(t)$, when the input field distribution equals $F_j$, and the $k^{th}$ object of the training set is being interrogated. In the presently preferred embodiment, there are K=20 training objects, and thus 20 patterns in the training set consisting of 800 real scalars each. In addition, the total number of complex transfer-function values in the training set is equal to KMN'=20×20×20=8000. The 250 outputs associated with the training patterns are the respectively known three-dimensional spatial distributions of a set of material constitutive parameters of the training objects.

The neural network, having been so configured, is used to determine quantitatively the three-dimensional spatial distribution of the complex values of an unknown object's Lamé module, i.e., $\lambda(x,y,z,f_o)=\lambda_r(x,y,z,f_o)+j\lambda_i(x,y,z,f_o)$ and $G(x,y,z,f_o)=G_r(x,y,z,f_o)+j G_i(x,y,z,f_o)$, together with its mass density, $\rho(x,y,z)$. In the presently preferred embodiment, the desired set of constitutive parameters is given by the real part of $\lambda(x,y,z,f_o)$, that is, we reconstruct only $\lambda_r(x,y,z,f_o)$. Thus, for the spherical objects which have a volume of approximately 5.23 $10^{-4}$ m³, and for the neural network which has 250 outputs, corresponding to $\lambda_r(x,y,z,f_o)$, the volumetric resolution is 2.09 $10^{-6}$ m³, or 2.09 cm³. For cubic voxels, this will be seen to correspond to a linear resolution of about 1.27 cm.

We recall that other constitutive parameters, like the Poisson's ratio ν, the Young's modulus, E, and the volume compression modulus, K, can be easily computed from λ and G: $\nu=\lambda/\{2(\lambda+G)\}$, $E=G(3\lambda+3G)/(\lambda+G)$, and $K=\lambda+2G/3$; they are, in general, complex functions of x, y, z, and f. In addition, in this preferred embodiment, the embedding medium (given the suffix "e" in the following notation) is deionized water (given the suffix "w" in the following notation) and its Lamé constants are $\lambda=\lambda_e=\lambda_w=2.25\ 10^9\text{-j}\omega(2/3)10^{-3}$ [Nm$^{-2}$] and $G=G_e=G_w=j\omega 10^{-3}$ [Nm$^{-2}$] and $\rho=\rho_e=\rho_w=10^3$ [kgm$^{-3}$].

In a slight modification of the above embodiment, it is possible to increase the resolution, or alternatively, to decrease the number of hidden and output units of the neural network (and thereby the complexity of the training procedure), by taking advantage of the spherical symmetry and a priori knowledge of the class of objects being interrogated. In this alternative embodiment, we use a neural network with 100 hidden units and 39 output units, and each output unit corresponds to a particular value for the inner radius of the spherical shell, with a spacing resolution of 1 mm. For example, a spherical shell with inner radius equal to 2.1 cm would ideally have the 12th output unit equal to one with all other units equal to zero. In this embodiment, the unit with maximum value is the one chosen as an estimate for the inner radius.

The preceding description has proceeded on the basis that a neural network can be used to invert the transfer-function data to provide accurate estimates of the desired set of material constitutive parameters of an object. This follows from the facts that (1) a neural network can approximate any multivariate nonlinear function (under certain mild regularity and continuity conditions) and (2) analysis of the wave equations demonstrates that a well-defined functional relationship exists between the constitutive parameters and the scattered field quantities (see below). In cases when the problem is ill-posed (i.e., a unique inverse does not exist), the neural network will converge to a solution that is optimal in a least-squares sense. Moreover, it does this with little or no a priori knowledge about the underlying functional form of the desired inverse mapping. The power of the neural network lies in its ability to self-organize into an appropriate structure for optimal estimation of the material constitutive parameters, using the training objects to guide the construction of the optimal-nonlinear inverse-mapping.

Of fundamental consideration with respect to the practical invertibility of the wave equation is the degree of dimensionality of the relevant field variables. For the embodiments of the invention as disclosed above, i.e., for acoustic 3-D reconstruction, we can show that the acoustic field can be completely characterized by a maximum of six functions of only two variables, at each frequency, f. This is demonstrated in summary form as follows.

We consider, without any loss of generality, an unknown object composed of isotropic materials. We further assume it to be embedded in a uniform and isotropic medium. Then the linear interaction of a time harmonic (i.e., monochromatic) acoustic field with the unknown object can be described by the following wave equation, in terms of the displacement vector $s(x,y,z,\omega)$ [m] of a material point at rest in $(x,y,z)$ in Cartesian coordinates:

$$\nabla^2(Gs)+\nabla[\lambda+G)\nabla \cdot s]+\omega^2\sigma s=(\nabla^2 G)s+(\nabla G)\,(\nabla \cdot s) \quad (1)$$

where $G$, $\lambda$, depend on $(x,y,z,\omega)$, $\rho=\rho(x,y,z)$, and $\omega=2\pi f$. The stress tensor, $\sigma_{ij}(x,y,z,\omega)$ [Nm$^{-2}$] is given by $$\sigma_{ij}(x,y,z,\omega)=G(\delta s_i/\delta s_j+\delta s_j/\delta s_i)+\lambda\delta_{ij}\nabla \cdot s \quad (2)$$

$i,j=1,2,3$, where the values 1,2,3 of $i$ and $j$ mean, respectively, x, y, or z directions, and $\delta_{ij}$ is the Kronecker index, i.e., $\delta_{ij}=1$ if $i=j$, and $\delta_{ij}=0$ if $i\neq j$.

In the uniform embedding medium, the Lamé moduli and the density become, respectively, $G_e$, $\lambda_e$ and $\sigma_e$, so that the wave equation can be written (within the embedding medium) as $$G_e\nabla^2(s)+(\lambda_e+G_e)\nabla\nabla \cdot s+\omega^2\sigma_e s=0 \quad (3)$$

It is convenient to decompose s into the sum of an irrotational component, $s_L$, and a solenoidal component, $s_T$:

$$s=s_L+s_T \quad (4a)$$

such that $$\nabla \times s_L=0 \quad (4b)$$

and $$\nabla \cdot s_T=0. \quad (4c)$$

We can also show that the acoustic field, i.e., the irrotational (longitudinal) displacement vector, $s_L$, in the embedding medium, which without loss of generality is assumed to be a Newtonian viscous fluid, can be described by the gradient of a scalar function, $u=u((x,y,z,t)$, such that at any point in the embedding medium, $s_L=-\nabla u$, so that $s=-\nabla u+s_T$.

Using all of the above, we can demonstrate that the actual field at any point in the embedding fluid can always be expressed as $$u=Re\int\int_{-\infty}^{-\infty}\{[\xi_{iu}\exp(-jzf_{z,L})+\xi_{ru}\exp(jzf_{z,L})]\cdot \quad (5a)$$

$$\exp[j(xf_x+yf_y)]\exp(j\omega t)\}\,df_x\,df_y$$

$$s_{T,m}=Re\int\int_{-\infty}^{-\infty}\{[\xi_{im}\exp(-jzf_{z,T})+\xi_{rm}\exp(jzf_{z,T})]\cdot \quad (5b)$$

$$\exp[j(xf_x+yf_y)]\exp(j\omega t)\}\,df_x\,df_y$$

and m=x, y, z. In the above expressions, Re means real part; the suffixes "i" and "r" mean incident (along increasing z) and reflected wave, respectively; $\xi_{iz}=(f_x/f_z)\xi_{ix}+(f_y/f_z)\xi_{iy}$ and $\xi_{yz}=-(f_x/f_z)\xi_{Tx}+(f_y/f_z)\xi_{ry}$; $f_x$ and $f_y$ are the spatial frequencies (i.e., the Fourier transform variables) with respect to x and y; $f_{z,L}=[(-\gamma_L^2)-f_x^2-f_y^2]^{1/2}$ and $f_{z,T}=[(-\gamma_T^2)-f_x^2-f_y^2]^{1/2}$, where $\gamma_L((x,y,z,\omega)=\alpha_L(x,y,z,\omega)+j/v_L(x,y,z,\omega)$ and $\gamma_T(x,y,z,\omega)=\alpha_T(x,y,z,\omega)+j/v_T(x,y,z,\omega)$. The real scalar functions $\alpha_L$ and $\alpha_T$ [m$^{-1}$] are the acoustic specific absorption parameters identified as longitudinal and transverse specific attenuations, and the real scalar functions $v_L$ and $v_T$ [ms$^{-1}$] are identified as the acoustic longitudinal and transverse wave phase velocities. The propagation constants are related to the Lamé constants and material density as follows:

$$v_L=\sqrt{\frac{(\lambda_r+2G_r)^2+(\lambda_I+2G_I)^2}{\rho}}\;\frac{\sqrt{2}}{\sqrt{\lambda_r+2G_r+\sqrt{(\lambda_r+2G_r)^2+(\lambda_I+2G_I)^2}}} \quad (6a)$$

$$\alpha_1=\frac{\omega}{\sqrt{z}}\sqrt{\frac{\rho}{(\lambda_r+2G_r)^2+(\lambda_I+2G_I)^2}}\;\frac{\lambda_I+2G_I}{\sqrt{\lambda_r+2G_r+\sqrt{(\lambda_r+2G_r)^2+(\lambda_I+2G_I)^2}}} \quad (6b)$$

$$v_r=\sqrt{\frac{(G_r^2+G_I^2)}{\rho}}\;\frac{\sqrt{2}}{\sqrt{G_r+\sqrt{G_r^2+G_I^2}}} \quad (6c)$$

and $$\alpha_r = \frac{\omega}{\sqrt{2}} \sqrt{\frac{p}{(G_r^2 + G_i^2)}} \frac{G_i}{\sqrt{G_r + \sqrt{G_r^2 + G_i^2}}} \quad (6d)$$

Equations (5a–5b) establish that, in the most general case, any acoustic field conformation, which was established by scattering of an incident force field on an object in a uniform embedding medium, can be expressed in terms of at most six independent complex scalar functions $\xi_{iu}$, $\xi_{ru}$, $\xi_{ix}$, $\xi_{rx}$, $\xi_{iy}$, and $\xi_{ry}$. These six scalars are functions of the spatial frequencies $f_x$, $f_y$, only, at each radian frequency, $\omega$. The importance of the above analytic description is that it demonstrates the inherent finite dimensionality of the acoustic scattering problem, and serves as the foundation on which 3-D reconstruction of an unknown object can be achieved, according to the methods and apparatus disclosed.

Another embodiment of the invention uses electromagnetic fields instead of acoustic to interrogate the object and provide data for the 3-D reconstruction of a set of material constitutive parameters. In this case, the constitutive parameters of any physical isotropic object "illuminated" by an electromagnetic field in the linear regime are summarized by its complex electric and magnetic permittivities:

$$e(x,y,z,\omega) = e_o[e_r(x,y,z,\omega) - j\, e_i(x,y,z,\omega)] \quad (7a)$$

$$\mu(x,y,z,\omega) = \mu_o[\mu_r(x,y,z,\omega) - j\, \mu_i(x,y,z,\omega)] \quad (7b)$$

where $e_o = 8.854 \times 10^{-12}$ [Fm$^{-1}$] and $\mu_o = 4\pi \times 10^{-7}$ [Hm$^{-1}$] are the electric and magnetic permittivities, respectively, of vacuum. The object is described in terms of the spatial distributions of the four real scalar functions $e_r$, $e_i$, $\mu_r$, and $\mu_i$ evaluated at the source-field frequency $f = \omega/(2\pi)$. They are the object constitutive parameters and are dimensionless. We assume that the object to be electromagnetically reconstructed is finite in size and fully embedded in an external isotropic medium, whose permittivities $e_e$ and $\mu_e$ are real constants. In most applications involving electromagnetic reconstruction, and for this embodiment, the object is embedded in air, so that $e_e = e_o$ and $\mu_e = \mu_o$, to a very good degree of approximation. We note that the methods disclosed by this patent can easily be adapted to the case of any embedding medium.

Figure 3:
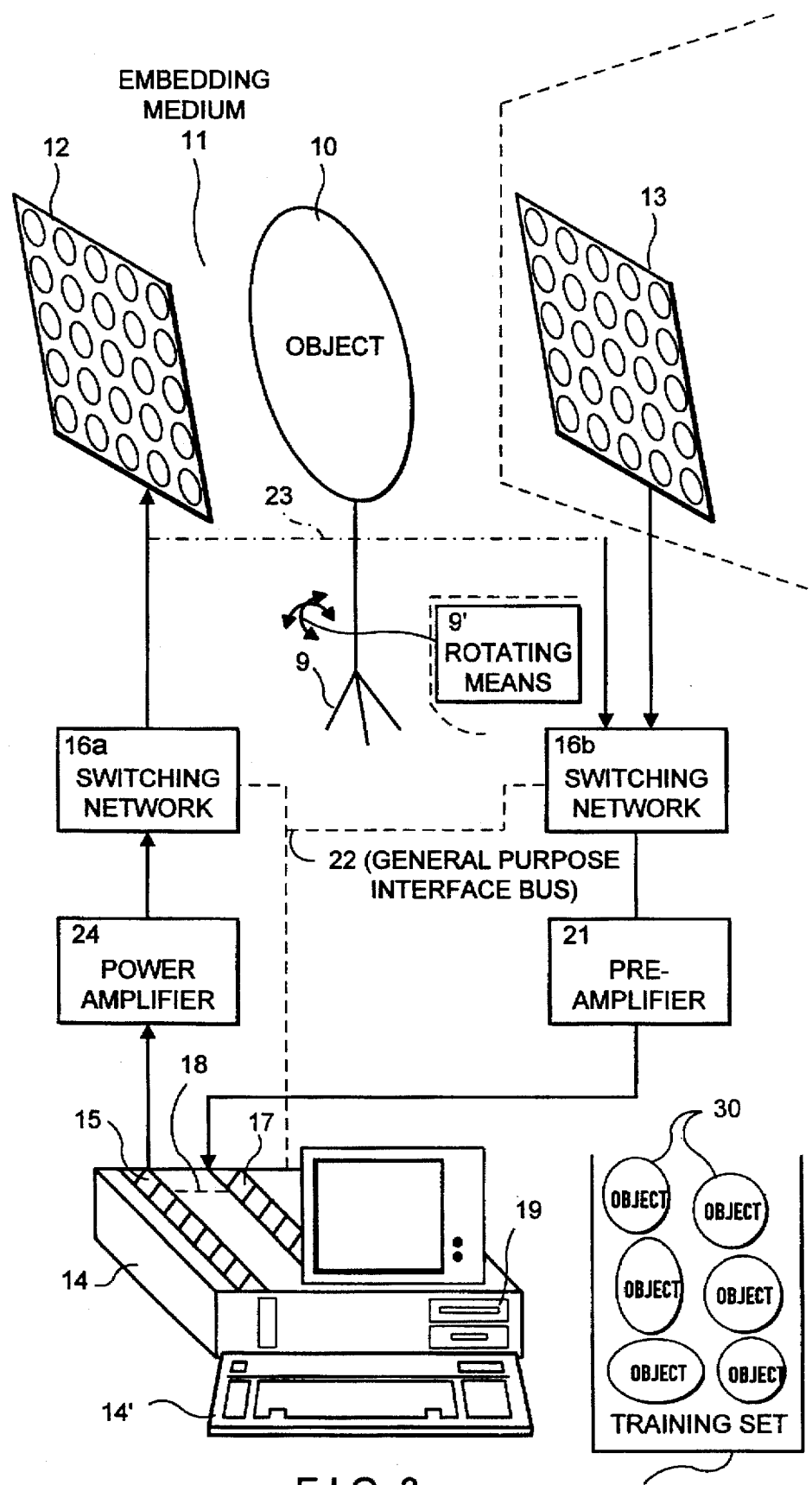
FIG. 3 is an electrical-circuit diagram schematically showing the interconnected relation of components of apparatus of the invention, but for another embodiment.

In the embodiment referred to in the above paragraph, i.e., for identification of a set of electromagnetic constitutive parameters of an object, the apparatus is similar to that used for the acoustic reconstruction in FIG. 1. In FIG. 3, an unknown object 10 to be analyzed non-destructively suitably supported is shown surrounded by an embedding medium 11, which in the case of electromagnetic fields, is typically air, and to be interposed between two array transducers 12, 13, which may be identically the same. Most of the components of the apparatus for this embodiment are identical to that of FIG. 1, and only those which are distinct will be explicitly characterized. These include the array-source and array-detector transducers, and the training and unknown objects. Also, because the embedding medium is air, a container for the embedding medium is not used. In this alternative embodiment, each array transducer is identically constructed of a 5 element by 5 element planar array of 1 cm diameter coils of #18 magnet wire of 30 turns each, each spaced 1 cm from coil center to coil center. The coils are mounted on a 5 mm thick planar sheet of polymethylmethacrylate; each of identical arrays 12, 13, consist of 25 coils each. The training objects are similar to those described for the first embodiment, except that the interior of the spherical shell is filled with saline having a conductivity of 1 S. In this alternative embodiment, the feedforward neural network is configured to have 1,250 inputs (a magnitude and phase for each of the 625 complex $H_{ij}(f_o)$'s), 240 hidden units and 250 outputs. The outputs correspond to the three dimensional set of values corresponding to the imaginary part of the dielectric permittivity, $e_i(x,y,z,\omega)$, known also as the conductivity.

In analogy to the acoustic case, a statement can also be made with respect to the number of functions necessary to characterize the scattered electromagnetic field in the embedding medium. Using equations similar to (5a–5b) and the analysis which led up to them, it can be shown that a maximum of four independent complex scalar functions of two (Fourier transform spatial frequency) variables each can completely characterize the electromagnetic field at any point in the embedding medium. As before, the importance of the above analytic characterization is that it demonstrates the inherent finite dimensionality of the electromagnetic scattering problem, and places an upper bound on the number of inputs required for a given spatial resolution in the output. This characterization serves as the foundation on which electromagnetic 3-D reconstruction of an unknown object can be achieved, according to the methods and apparatus disclosed.

It will be seen that the training of the neural network for any of the embodiments described thus far can be accomplished with many different sets of training objects. In general, the training objects should mimic in some generic fashion the characteristics of the unknown objects for which the apparatus and method will be used to determine the set of desired constitutive properties. For example, if it is known that the unknown objects will consist of a certain geometric shape, or class of shapes, then the training objects should also be of that shape, or that class of shapes, respectively. Similarly, if the range of constitutive parameter values of the unknown objects to be reconstructed can be specified beforehand, then the values of constitutive parameters associated with the training objects should also be within that range. It will also be seen that it is important to have a large enough number of training objects in order to appropriately configure the neural network. It should be understood that the effective number of training objects can be much larger than the number of objects which are physically available. In particular, it is possible to take advantage of an object's spatial asymmetry, and create from each training object many scattered field patterns, through spatial transformation of the object. For example, rotation of a non-spherically symmetric object (with respect to the three-dimensional distribution of constitutive parameters), can provide the equivalent of literally thousands of training objects from a single physical object. Each spatial orientation chosen for a particular training object can provide a unique set of constitutive parameter values and scattered field pattern, and serve as an additional exemplar in the neural network training procedure. It may also be seen that the entire set of spatial transformations associated with a training object can be implemented using computer controlled robotics, or equivalently, three-dimensional translation and angular rotation stepper motor control. For any spatial orientation of a training object, the constitutive parameters can be calculated using geometric matrix transformations. In this alternative embodiment of the invention, and as depicted in FIG. 1 and FIG. 3 by the dashed lines between object support 9 and rotating means 9', each training object may be understood to be rotated manually in 1 degree increments from 0° to 359°, to acquire a total of 360 scattered fields for each source-field pattern and for each training object. It should also be understood that one may instead rotate the array-source and array-detector transducers, while keeping the object fixed in space. This provides an alternative means for increasing the number of training patterns.

In yet another embodiment of the invention, the array-source transducer is adapted not only for transmitting the set of source-field patterns, but for receiving the back-scattered field as well. In this embodiment, and as shown in FIG. 1 and FIG. 3 by the dashed line representing an electrical connector 23 between switching network 16b and transmitting transducer 12, the training signals used for the neural network configuration consists of both the transfer-function values associated with the array-detector transducer, as well as with the transfer-function values associated with those signals received by the array-source transducer, acting as receiver. In another modification of the preferred embodiment, and as shown diagrammatically by a dashed line between the array-detector transducer 13 and object 10 in FIG. 1 and FIG. 3, the array-detector transducer 13 is removed so that only the array-source transducer 12 remains, which is this case acts both as a transmitter and receiver of the source-field patterns and back-scattered fields, respectively.

It will be seen also that the methods and apparatus disclosed here encompasses not only linear interactions of acoustic and electromagnetic fields with material objects, but also non-linear interactions as well. If such non-linear interactions are to be considered, higher order constitutive parameters are defined, so that the object is characterized up to the order needed according to the actual field intensity to which the object is exposed. This can be done using a Volterra expansion, for example. In this case, it will be understood that the constitutive parameters will become the coefficients of the Volterra expansion, for example. In addition, the methods of this patent can also be extended to the case of anisotropic materials as well. If the object is made from materials which are anisotropic, its constitutive parameters will be further understood to be, in the general case, tensors.

It should be additionally understood that the neural network as presented here need not necessarily be feedforward. In an alternative embodiment, the neural network is of the recurrent type, which evolves in time as a nonlinear dynamical system. In this embodiment, the input to the neural network at each discrete time step will be understood to be the magnitude and phase of the M array-detector outputs. The network will further be understood to have been configured, through a training process analogous to that already described, to output at the end of the sequential presentation of the N' source-field patterns, an estimate of a set of the three-dimensional spatial distribution of material constitutive parameters of an object.

Figure 4:
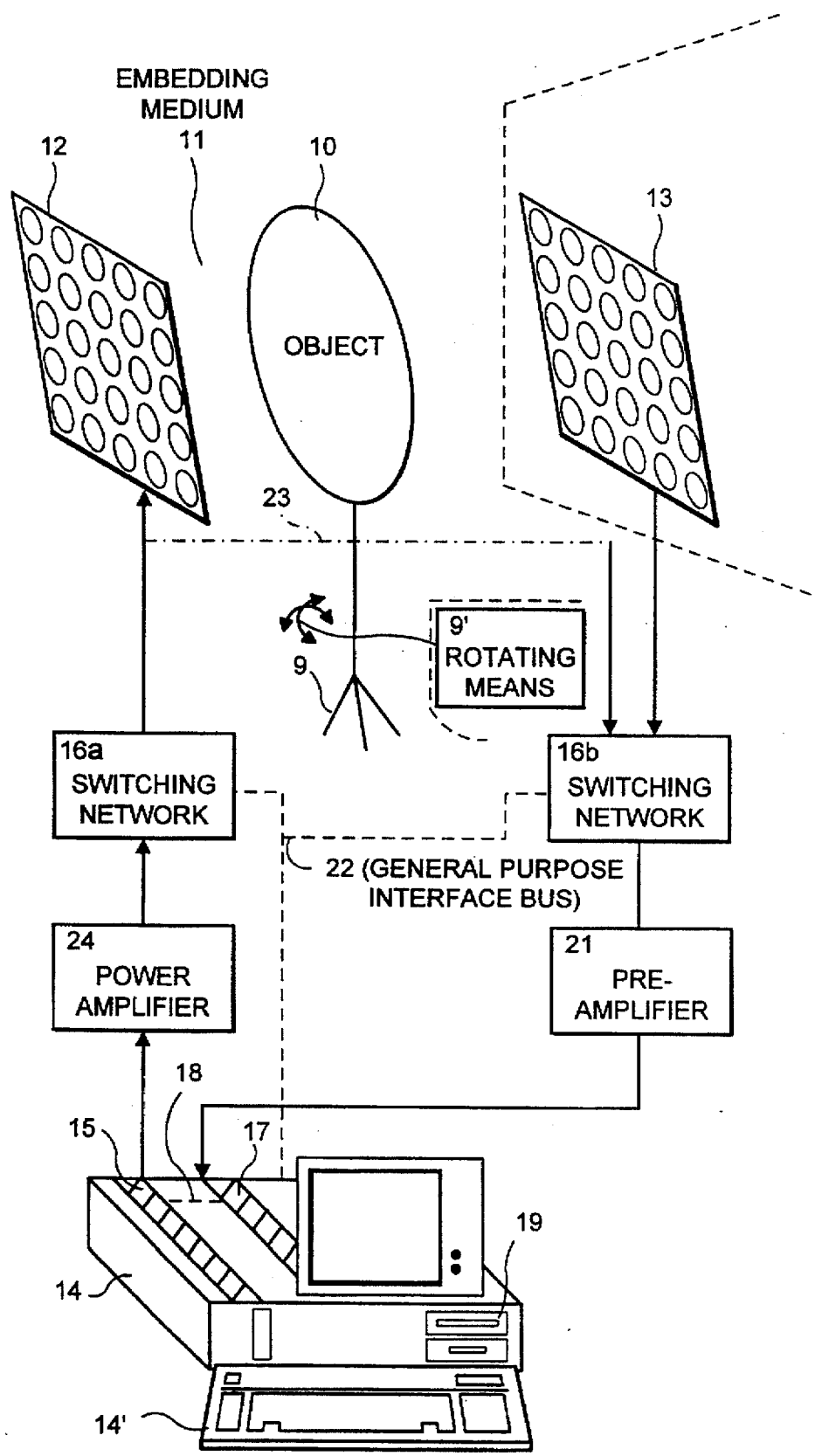
FIG. 4 is an electrical-circuit diagram schematically showing the interconnected relation of components of apparatus of the invention, but for another embodiment.

In yet another embodiment of the invention, and as shown in FIG. 4, the set 31 of training objects is replaced by a set of numerical (i.e., computational) evaluations of the scattered fields which are stored (but not shown) in computer 14. This is useful as it does not require the use of a large number of physical training objects, whose construction can be both difficult and time consuming. As the components of FIG. 4 are largely identical to those of FIG. 3, only the differences between them are disclosed herein. In a presently preferred embodiment of the invention, a computer software program is used to simulate the scattered electromagnetic field values which would result from an actual set of physical training objects being placed between the two transducers 12, 13. In this case, a set of "simulated" training objects is "constructed" using the simulation software package. The computer program may suitably be the FDTD software package available from REMCOM, Inc., of State College, Pa., and may be assumed to be loaded into computer 14 of FIG. 4. (This software may be assumed to include an suitable operating system necessary to execute the FDTD software package.) This software package allows the independent specification of the complete three-dimensional spatial distribution of the constitutive parameters of the simulated training objects. In this embodiment of the invention, the simulated scattered electromagnetic field values for each simulated training object within the simulated set of training objects (not shown in FIG. 4) are computed and stored in computer 14. It should be understood that the computer simulations of the scattered fields incorporate the effects of both the array-source and array-detector transducers as well as the embedding medium. The simulations also incorporate a set of electrical excitation signals similar to those utilized in generating the actual scattered electromagnetic fields for the physical training objects as disclosed supra. These electrical excitation signals serve as input to the array-source transducer in the numerical computations. The simulated electromagnetic scattered field values thereby computed are used to evaluate the set, $K_g$, of transfer function values which serve as inputs for training a neural network, as described supra. Once trained on the computer simulated data, the neural network may be used to estimate the constitutive properties of an unknown object 10, using the apparatus as herein disclosed.

Figure 5:
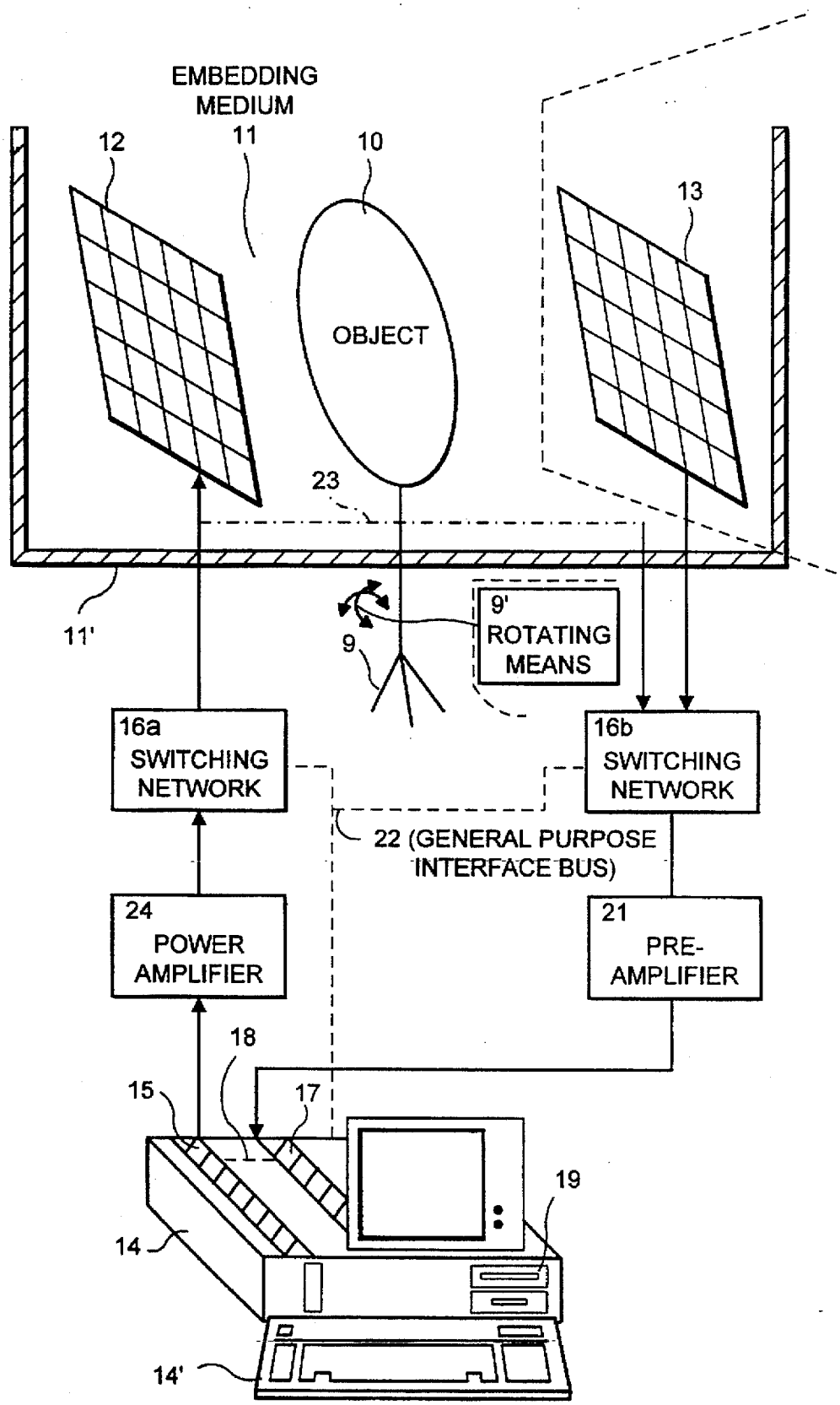
FIG. 5 is an electrical-circuit diagram schematically showing the interconnected relation of components of apparatus of the invention, but for another embodiment.

In another embodiment of the invention, and analogously to the electromagnetic inverse scattering embodiment shown in FIG. 4, FIG. 5 is a schematic diagram of an acoustic inverse scattering apparatus. The set 31 of training objects is replaced by a set of numerical (i.e., computational) evaluations of the acoustic (e.g., ultrasonic) scattered fields which are stored (but not shown) in computer 14. As the components of FIG. 5 are largely identical to those of FIG. 1, only the differences between them are disclosed herein. In a presently preferred embodiment, a computer software program is used to simulate the scattered acoustic field values which would result from an actual set of physical training objects being placed between the two transducers 12, 13. In this case, a set of "simulated" training objects is "constructed" using the simulation software. The computer program may suitably be an implementation of the algorithm described in the article "Real-Time Parallel Computation and Visualization of Ultrasonic Pulses in Solids," by R. S. Schecter et al., published in the journal Science, Vol. 265, Aug. 26, 1994, pp. 1188–1192, and incorporated by reference herein. Although the computational method may best be simulated on a parallel computer, it may also be executed on a single processor computer as well, albeit with additional time required for computation. The computer algorithm may be assumed to be programmed and loaded into computer 14 of FIG. 5. In this embodiment of the invention, the simulated scattered acoustic field values for each simulated training object within the simulated set of training objects (not shown in FIG. 5) are computed and stored in computer 14. The simulations also incorporate a set of electrical excitation signals similar to those utilized in generating the actual scattered acoustic fields for the physical training objects as disclosed supra. These electrical excitation signals serve as input to the array-source transducer in the numerical computations. The simulated acoustic scattered field values are used to compute the set, $K_g$, of transducer function values which serve as inputs for training a neural network, as already described. Once trained on the computer simulated data, the neural network may be used to estimate the constitutive properties of an unknown object 10, using the apparatus as herein disclosed.

In yet a further embodiment of the invention, the output of the neural network corresponds not to the actual three-dimensional constitutive parameters of an unknown object but to the Biot material parameters associated with the object. The Biot parameters are parameters which are useful for characterizing the poro-elastic properties of a fluid filled porous structure, and represent a very convenient way in which to significantly reduce the dimensionality of an inverse scattering problem. The Biot parameters can also provide information on the mechanical and electrical properties of a three-dimensional structure, including but not limited to the ability of fluid to flow through the structure, the average electrical conductivity of the structure, and its solid volume fraction. Often these lower dimensional (in comparison to the full three-dimensional spatial distribution of constitutive parameters) Biot parameters can provide sufficient information on an unknown object in order to characterize it usefully for a particular application. For example, if the unknown object represents a portion of the earth, then knowledge of the Biot parameters can provide information as to the ability to extract oil from the ground (related to the permeability of the earth). As another example, knowledge of the Biot parameters of a bony member within a living body can provide information on the strength of the bony member (related for example to the porosity of the bone). A good description of Biot theory can be found in the articles "Recent Developments in the Acoustic Properties of Porous Media" by David L. Johnson in Frontiers in Physical Acoustics, 1986, Soc. Italiano di Fisica, Bologna, Italy, pp. 255–290 and in "Theory of Propagation of Elastic Waves in a Fluid Saturated Porous Solid, Parts I and II," by M. A. Biot in Journal of the Acoustical Society of America, vol. 28, no. 2, 1956, pp. 168–191. It should be understood that the Biot parameters can be evaluated for a particular object or porous structure from knowledge of the three-dimensional spatial distribution of material constitutive parameters of the object. (Conversely however, the three-dimensional constitutive parameters of an object cannot in general be evaluated uniquely from its associated Biot parameters.) In one presently preferred embodiment of the invention, the scattered electromagnetic field measurements are used by the neural network to reconstruct two of the Biot poro-elastic parameters of the unknown object, the permeability and porosity. It should be further understood that the Biot parameters may be estimated using either scattered acoustic fields or scattered electromagnetic fields, or in some applications, both types of fields may be utilized. A further point that should be appreciated is that the three-dimensional spatial distribution of a set of material constitutive properties can be represented by various lower dimensional characterizations as described supra in the case of geometric characterizations. In general, the three-dimensional spatial distribution of a set of material constitutive properties should be understood to include a wide variety of geometric and material characterizations of the unknown object.

It should be additionally understood that the array transducers utilized in all embodiments of the invention, that is components 12 and 13 in each of FIG. 1, FIG. 2, FIG. 4, and FIG. 5 need not be planar, but can be formed in the shape of an arbitrary surface in three-dimensional space. In one preferred embodiment, a single transducer which surrounds the object is used to transmit and receive the scattered fields. It should further be understood that the array-source transducer utilized in this invention may operate not only to expose the unknown object to an acoustic or electromagnetic field, but also can serve as a receive of the scattered acoustic or electromagnetic field respectively, in addition to the array-detector transducer. In another embodiment of the invention, a single transducer serves both to transmit and receive the acoustic or electromagnetic fields.

It will also be seen that the electrical input signal need not necessarily be narrowband, i.e., a single frequency. Other choices are possible including, for example, a composite-sine wave, in which a set of frequencies are simultaneously applied to the array-source transducer which enables the estimation of the transfer function values at the entire set of frequencies which were included in the input composite-sine wave. Additionally, the input can be a finite-time pulse type waveform, which has associated with it an infinite number of frequencies. In either of these cases the methods of this patent may be directly extended to process all the frequencies present in the waveforms, thereby reconstructing the set of constitutive parameters at the set of respective frequencies present in the input signals.

Finally, it should be understood that the disclosed invention can find application to many industrial and scientific problems, including but not limited to oil exploration (in which the unknown object represents the earth below the surface of an explored area, and in which the array transducers may be placed in a number of configurations which may be necessity not be in mutually facing positions), breast cancer detection, food and agricultural sciences and bone fracture healing assessment.

It will be seen that the described invention meets all stated objectives as to the three-dimensional reconstruction of a set of material constitutive parameters of an object, with the specific advantages that it does not require the analytic or direct numerical inversion of the field equations, and at the same time compensates for:

(1) nonideal field sources, which can be partially unknown a priori;

(2) finite volume of the embedding medium and scattering due to its external boundaries;

(3) finite extension of the detector array;

(4) finite size and systematic errors of the nonideal detectors, whose transfer functions can be partially unknown a priori;

(5) noise effects, which are optimally filtered;

(6) lack of reliability, efficiency or speed of the presently available algorithms, by avoiding any field equations and adopting a suitable architecture of artificial intelligence parallel processors instead. They are trained with a complete set of known objects (training set) to perform directly the 3-D reconstruction. If analog artificial intelligence parallel processors are used, real time reconstructions can also be achieved.

What is claimed is:

1. Apparatus for non-destructively and quantitatively determining the three-dimensional spatial distribution of a set of material constitutive parameters of an unknown object, said apparatus comprising:

(a) a set of computer simulated training objects for which the three-dimensional spatial distribution of a set of their material constitutive parameters is known;

(b) computer-software means for computationally simulating a set of scattered fields, whereby to produce a set of training signals associated with said set of computer simulated training objects;

(c) a neural network connected for response to said set of training signals;

(d) array-source transducer means for producing a set of source-field patterns for exposure to said unknown object in response to a set of electrical input signals;

(e) signal-generator means connected to said array-source transducer means for producing said set of electrical input signals to thereby expose said unknown object to a set of source-field patterns associated with said electrical input signals, whereby to produce a scattered field for said exposed unknown object for each source-field pattern;

(f) exposed array-detector transducer means for receiving said scattered fields and signal processing means associated with said array-detector transducer means thereby producing a set of input signals; and (g) means for comparatively processing said training signals and said known constitutive parameters to train said neural network, whereby said neural network becomes optimally conditioned to quantitatively determine material constitutive properties of the unknown object upon substitution of said set of input signals for the set of training signals.

2. Apparatus according to claim 1, wherein said source-field patterns are of radiated acoustic energy.

3. Apparatus according to claim 1, wherein said source-field patterns are of radiated electromagnetic energy.

4. Apparatus for non-destructively and quantitatively determining a set of the Biot poro-elastic material parameters of an unknown object, said apparatus comprising:

(a) a set of computer simulated training objects for which the set of the Biot poro-elastic material parameters is known;

(b) computer-software means for computationally simulating a set of scattered fields, whereby to produce a set of training signals associated with said set of computer simulated training objects;

(c) a neural network connected for response to said set of training signals;

(d) array-source transducer means for producing a set of source-field patterns for exposure to said unknown object in response to a set of electrical input signals;

(e) signal-generator means connected to said array-source transducer means for producing said set of electrical input signals to thereby expose said unknown object to a set of source-field patterns associated with said electrical input signals, whereby to produce a scattered field for said exposed unknown object for each source-field pattern;

(f) exposed array-detector transducer means for receiving said scattered fields and signal processing means associated with said array-detector transducer means thereby producing a set of input signals; and (g) means for comparatively processing said training signals and said known Biot poro-elastic parameters to train said neural network, whereby said neural network becomes optimally conditioned to quantitatively determine Biot poro-elastic material parameters of the unknown object upon substitution of said set of input signals for the set of training signals.

5. Apparatus according to claim 4, wherein said source-field patterns are of radiated acoustic energy.

6. Apparatus according to claim 4, wherein said source-field patterns are of radiated electromagnetic energy.

7. Apparatus for non-destructively and quantitatively determining the three-dimensional spatial distribution of a set of material constitutive parameters of an unknown object, said apparatus comprising:

(a) a set of computer simulated training objects for which the three-dimensional spatial distribution of a set of their material constitutive parameters is known;

(b) computer-software means for computationally simulating a set of scattered fields, whereby to produce a set of training signals associated with said set of computer simulated training objects;

(c) a neural network connected for response to said set of training signals;

(d) array-transducer means for producing a set of source-field patterns for exposure to said unknown object in response to a set of electrical input signals;

(e) signal-generator means connected to said array-transducer means for producing said set of electrical input signals to thereby expose said unknown object to a set of source-field patterns associated with said electrical input signals, whereby to produce a back-scattered field for said unknown object for each source-field pattern;

(f) said array-transducer means being exposed to receive said back-scattered fields;

(g) signal processing means associated with said array-transducer means for producing for each source-field pattern a set of input signals based on the received back-scattered fields; and (h) means for comparatively processing said training signals and said known constitutive parameters to train said neural network, whereby said neural network becomes optimally conditioned to quantitatively determine material constitutive properties of the unknown object upon substitution of said set of input signals for the set of training signals.

8. Apparatus according to claim 7, wherein said source-field patterns are of radiated acoustic energy.

9. Apparatus according to claim 7, wherein said source-field patterns are of radiated electromagnetic energy.

10. Apparatus for non-destructively and quantitatively determining a set of the Biot poro-elastic material parameters of an unknown object, said apparatus comprising:

(a) a set of computer simulated training objects for which the set of the Biot poro-elastic material parameters is known;

(b) computer-software means for computationally simulating a set of scattered fields, whereby to produce a set of training signals associated with said set of computer simulated training objects;

(c) a neural network connected for response to said set of training signals;

(d) array-transducer means for producing a set of source-field patterns for exposure to said unknown object in response to a set of electrical input signals;

(e) signal-generator means connected to said array-transducer means for producing said set of electrical input signals to thereby expose said unknown object to a set of source-field patterns associated with said electrical input signals, whereby to produce a back-scattered field for said unknown object for each source-field pattern;

(f) said array-transducer means being exposed to receive said back-scattered fields;

(g) signal processing means associated with said array-transducer means for producing for each source-field pattern a set of input signals based on the received back-scattered fields; and (h) means for comparatively processing said training signals and said known constitutive parameters to train said neural network, whereby said neural network becomes optimally conditioned to quantitatively determine Biot poro-elastic material parameters of the unknown object upon substitution of said set of input signals for the set of training signals.

11. Apparatus according to claim 10, wherein said source-field patterns are of radiated acoustic energy.

12. Apparatus according to claim 10, wherein said source-field patterns are of radiated electromagnetic energy.

13. The method of non-destructively and quantitatively determining the three-dimensional spatial distribution of a set of material constitutive parameters of an unknown object, using a neural network and two array transducers, one of which is an array-source and the other of which is an array-detector, that are adapted to transmit a set of force-field patterns and receive a set of scattered-field patterns from an unknown object, which method comprises the steps of:

(a) computationally simulating and storing sets of scattered fields associated with said set of force-field patterns and associated with a set of computer simulated training objects for which their three-dimensional spatial distributions of a set of their material constitutive parameters is known, whereby producing a set of training signals;

(b) connecting said neural network for response to said set of training signals;

(c) positioning said array-source transducer and said array-detector transducer nearby to said unknown object;

(d) driving said array-source transducer with a set of electrical input signals, whereby said array-source transducer exposes said unknown object to a set of source-field patterns associated with said electrical input signals, whereby to produce a scattered field pattern for exposed unknown object, for each source-field pattern;

(e) sequentially processing each electrical output signal received by the array-detector transducer to determine and store a set of complex transfer-function values associated with said unknown object;

(f) training the neural network using the stored sets of training signals associated with the known computer simulated training objects and set of known constitutive parameters; and (e) processing the stored set of complex transfer function values associated with the unknown object using the trained neural network to determine non-destructively and quantitatively the three-dimensional spatial distribution of a set of material constitutive parameters of said unknown object.

14. The method according to claim 13, wherein said source-field patterns are of radiated acoustic energy.

15. The method according to claim 13, wherein said source-field patterns are of radiated electromagnetic energy.

16. The method according to claim 13, wherein said three-dimensional spatial distribution of a set of material constitutive parameters of an unknown object is a set of Biot poro-elastic parameters of an unknown object, and wherein said known three-dimensional spatial distributions of sets of material constitutive parameters associated with a set of known computer simulated training objects are a set of known Biot poro-elastic parameters associated with said set of known computer simulated training objects.

* * * * *